United States Patent [19]
Ikeda et al.

[11] Patent Number: 5,091,920
[45] Date of Patent: Feb. 25, 1992

[54] THRESHOLD VALVE CONTROL SYSTEM IN A RECEIVER CIRCUIT

[75] Inventors: Koji Ikeda, Kawasaki; Hideki Shutou, Chikushi, both of Japan

[73] Assignee: Fujitsu Limited, Kawasaki, Japan

[21] Appl. No.: 607,033

[22] Filed: Oct. 31, 1990

[30] Foreign Application Priority Data

Nov. 10, 1989 [JP] Japan .................. 1-291066

[51] Int. Cl.[5] .................. H04L 25/06; H03K 5/153
[52] U.S. Cl. .................. 375/76; 370/110.1; 328/149; 307/356
[58] Field of Search .................. 375/75, 76; 328/149; 307/351, 356, 358; 370/110.1

[56] References Cited

U.S. PATENT DOCUMENTS

| | | | |
|---|---|---|---|
| 4,375,037 | 2/1983 | Ikushima | 375/76 |
| 4,414,512 | 11/1983 | Nelson | 307/351 |
| 4,926,442 | 5/1990 | Bukowski et al. | 375/76 |
| 4,965,795 | 10/1990 | Coffelt et al. | 370/110.1 |

FOREIGN PATENT DOCUMENTS 61-227440 10/1986 Japan .

*Primary Examiner*—Benedict V. Safourek
*Assistant Examiner*—Young Tse
*Attorney, Agent, or Firm*—Staas & Halsey

[57] ABSTRACT

A threshold value control system for discriminating an input signal received by a receiver circuit is provided having a mode setting unit for determining a mode setting signal corresponding to a connection pattern of the receiver circuit. A variable threshold generating unit generates a variable threshold which varies depending on the variation of the level of the input signal. A constant threshold value generating unit generates at least one constant threshold by which the level of the input signal can be discriminated even when its level cannot be distinguished by the variable threshold value. A threshold comparing unit compares the variable threshold and each of the at least one constant threshold to output a comparison result. A switching unit passes only one of the variable threshold and the at least one constant threshold as a discriminating threshold based on the mode setting signal output from the mode setting unit and the comparison result output from the threshold comparing unit, the discriminating threshold being sufficient to discriminate the digital level of the input signal. A comparing unit compares the level of the input signal and the discriminating threshold to output a discriminated result, therefore, bit errors or synchronization deviation can be prevented even when there is a superimposition of frame signals or noise.

18 Claims, 14 Drawing Sheets

Fig. 1B

| NAME | | FUNCTION |
|---|---|---|
| NT1 | NETWORK TERMINATION 1 | · TERMINATE AT SUBSCRIBER LINE<br>· MAINTENANCE AND MONITORING IN LAYER 1<br>· TIMING<br>· POWER TRANSFER<br>· MULTIPLICATION IN LAYER 1<br>· INTERFACE TERMINATION (INCLUDING COLLISION CONTROL OF PLURAL TERMINALS) |
| NT2 | NETWORK TERMINATION 2 | · PROTOCOL PROCESSING IN LAYERS 2 AND 3<br>· MULTIPLICATION IN LAYERS 2 AND 3<br>· EXCHANGE<br>· LINE CONCENTRATION<br>· MAINTENANCE<br>· INTERFACE TERMINATION |
| TE | TERMINAL EQUIPMENT | · PROTOCOL PROCESSING<br>· MAINTENANCE<br>· INTERFACE<br>· CONNECTION WITH OTHER EQIPMENT |

«THRESHOLD VALVE CONTROL SYSTEM IN A RECEIVER CIRCUIT»

BACKGROUND OF THE INVENTION

1. Field of the Invention

The present invention relates to a threshold value control system in a receiver circuit in an ISDN (Integrated Systems Digital Network) terminal or in a network termination in an ISDN network.

2. Description of the Related Art

As a cross reference related to the present invention, Japanese Patent Publication No. 61-227440 is known to the public.

In the receiver circuit in the ISDN terminal or in the network termination, a comparator is conventionally used for comparing an input signal and a threshold voltage so as to discriminate the digital signal level of the input signal. As the methods for determining the threshold voltage, conventionally, there are a fixed method in which the threshold voltage is constant and an ATC (Automatic Threshold Control) method in which the threshold voltage is approximately linearly changed dependent on the voltage of the input signal.

In the prior art, there are problems in that, according to the fixed method, the regulation of a total phase deviation cannot be satisfied and, according to the ATC method, the threshold voltage fluctuates due to noises and so forth when using a point-to-point connection and the threshold voltage fluctuates due to the superimposition of the frame synchronization signals under the multipoint connection, as later described in more detail with reference to the drawings.

SUMMARY OF THE INVENTION

In view of the problems in the above-mentioned prior art, an object of the present invention is, based on the idea of adding a NT/TE switching function, in the ATC system, to prevent bit errors or synchronization deviation in the receiver circuit due to the fluctuation of the digital signals when determining threshold value by the influence of noise, or due to the fluctuation of digital signals when determining threshold values by the superimposition of frame synchronization signals when a plurality of ISDN terminals are connected to a network termination by a bus.

To attain the above and other objects, there is provided, according to the present invention, a threshold value control system for discriminating an input signal received by a receiver circuit. The system comprises a mode setting unit for determining a mode setting signal. The mode corresponds to a connection pattern by which the receiver circuit is connected to another terminal. The system further comprises a variable threshold value generating unit for generating a variable threshold value which varies depending on the variation of the level of the input signal; a constant threshold value generating unit for generating at least one constant threshold value by which the level of the input signal can be discriminated even when the level of the input signal cannot be distinguished by the variable threshold value; a threshold comparing unit for comparing the variable threshold value and each of the at least one constant threshold values to output a comparison result; a switching unit for passing only one of the variable threshold values and the at least one constant threshold value as an input digital signal discriminating threshold value, based on the mode setting signal output from the mode setting unit and the comparison result output from the threshold comparing unit. The input digital signal discriminating threshold value is, as a result, sufficient to discriminate the digital level of the input signal. The system still further comprises a comparing unit for comparing the level of the input signal and the input digital signal discriminating threshold value to output a discriminated result.

The receiver circuit is included in, for example, one of the NT1, NT2, and ISDN terminals in an ISDN network.

The model setting unit comprises a unit for generating an NT mode selecting signal when the receiver circuit is included in a terminal acting as a network termination in an ISDN network, and comprises a unit for generating a TE mode selecting signal when the receiver circuit is included in a terminal acting as terminal equipment in an ISDN network.

The variable threshold value generating unit comprises a unit for generating the variable threshold value which is a predetermined percentage of the peak level of the input signal and which increases in accordance with an increase in the level of the input signal.

The constant threshold value generating unit comprises a threshold value comparing unit for comparing the variable threshold value with each of the at least one constant threshold values to generate a comparison result, and further comprises a switch control unit for generating a switch control signal based on the mode setting signal output from the mode setting unit and the comparison result output from the threshold comparing unit. The input digital signal discriminating threshold value is output from the switching unit in response to the switch control signal output from the switch control unit.

The constant threshold value generating unit comprises a first threshold voltage generating unit for generating a first constant threshold value by which the input digital signal level can be discriminated by the comparing unit even when the variable threshold value is increased to be higher than the first constant threshold value so that the input digital signal level cannot be discriminated by the increased variable threshold value due to superimposition of frame signals from a plurality of terminals, and the switching unit comprises a unit for outputting the first threshold value when the variable threshold value is higher than the first constant threshold value and when the mode setting unit generates the NT mode selecting signal.

The switching unit comprises a unit for outputting the variable threshold value when the variable threshold value is lower than or equal to the first constant threshold value and higher than or equal to the second constant threshold value, and when the mode setting unit generates the NT mode selecting signal.

The switching unit comprises a unit for outputting the second threshold value when the variable threshold value is lower than the second constant threshold value and when the mode setting unit generates the NT mode selecting signal.

The switching unit comprises a unit for outputting the variable threshold value when the variable threshold value is higher than or equal to the second constant threshold value and when the mode setting unit generates the TE mode selecting signal.

The switching unit comprises a unit for outputting the second threshold value when the variable threshold value is lower than the second constant threshold value and when the mode setting unit generates the TE mode selecting signal.

Preferably, the switching unit comprises a unit for outputting the variable threshold value when the variable threshold value is lower than or equal to the first constant threshold value and higher than or equal to the second constant threshold value, and when the mode setting unit generates the NT mode selecting signal; a unit for outputting the second constant threshold value when the variable threshold value is lower than the second constant threshold value and when the mode setting unit generates the NT mode selecting signal; a unit for outputting the variable threshold value when the variable threshold value is higher than or equal to the second constant threshold value and when the mode setting unit generates the TE mode selecting signal; and a unit for outputting the second constant threshold value when the variable threshold value is lower than the second constant threshold value and when the mode setting unit generates the TE mode selecting signal.

BRIEF DESCRIPTION OF THE DRAWINGS

The above and other objects and features of the present invention will be more apparent from the following description of the preferred embodiments with reference to the drawings, wherein:

FIG. 1B is a chart explaining the functions of the network terminations and the terminal equipment;

DESCRIPTION OF THE PREFERRED EMBODIMENTS

Before describing the embodiments of the present invention, the prior art and the problems therein will be described for easier understanding of the present invention.

Figure 1A:
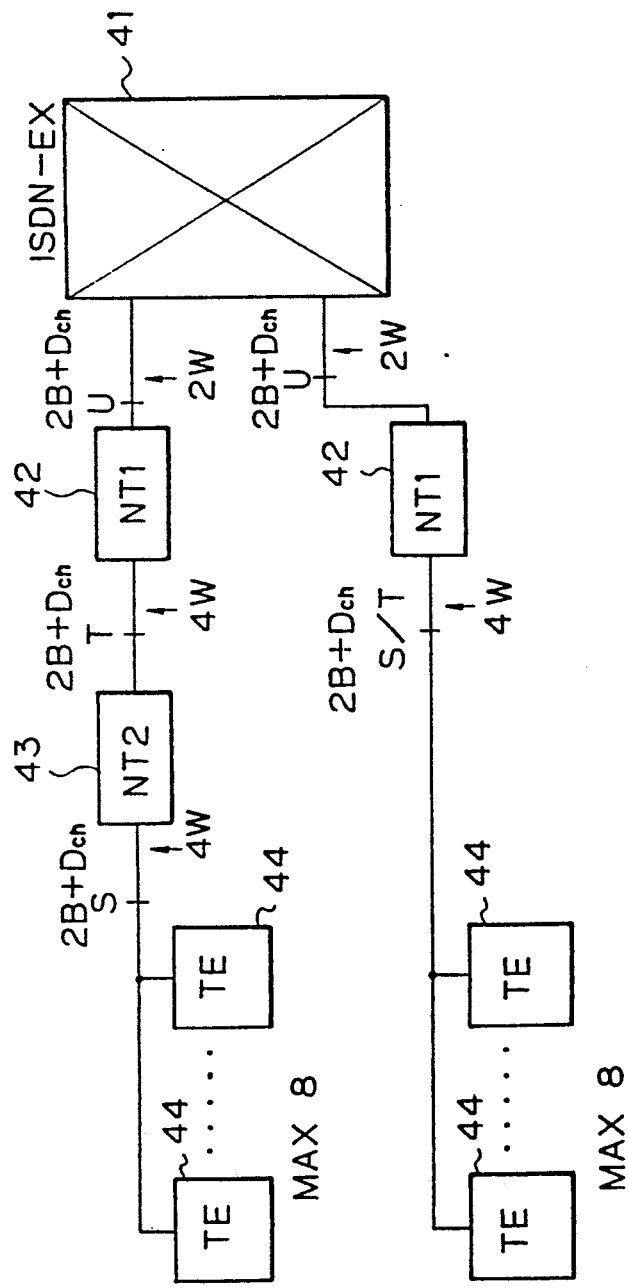
FIG. 1A is a block diagram showing the construction of the ISDN network for explaining the field of practical utilization in industry of the present invention.

FIG. 1A is a block diagram showing an example of the construction of an ISDN network, for explaining the field of utilization in industry of the present invention. In the figure, an ISDN exchange 41 is connected through a U-reference point to a network termination (NT1) 42, and the network termination (NT1) 42 is connected through a T-reference point to a network termination (NT2) 43, or is directly connected through a S/T reference point and not through the network termination (NT2) 43 to a maximum of eight ISDN terminals (TE) 44. At the U-reference point, two wires are provided to transmit signals by 2B+D channels. At the T-reference point and the S-reference point, four wires are provided to transmit signals by 2B+D channels. The (NT1) 42 has, as illustrated in the figure, the functions of terminating at a subscriber line, maintenance, monitoring, and timing functions in the layer 1, etc. The (NT2) 43 has functions such as protocol processing in the layers 2 and 3 and exchange function of a PBX, LAN and so forth. The (TE) 44 is a digital telephone set and so forth having the functions of protocol processing, maintenance functions, interface functions and so forth.

FIG. 1B is a chart explaining the functions of the network terminations and the terminal equipment.

The present invention relates to the receiver circuit in the network termination (NT1) 42 or (NT2) 43, or in the ISDN terminals (TE) 44.

Figure 2:
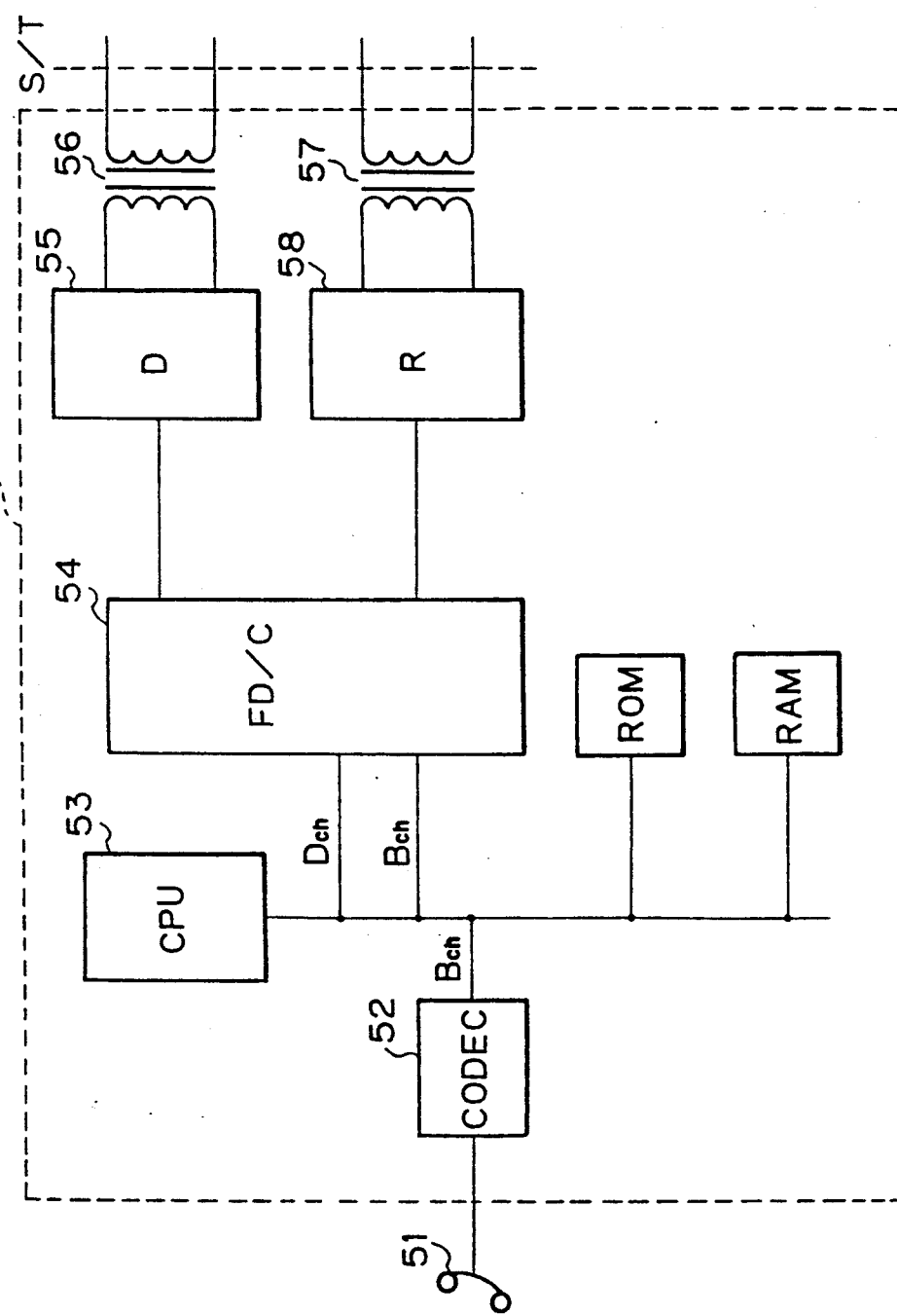
FIG. 2 is a block diagram showing an example of the construction of the ISDN terminal as background of the present invention.

FIG. 2 is a block diagram showing the construction of the ISDN terminal (TE) 44 as background of the present invention. In the figure, a voice signal from a hand set 51 is converted into a B-channel digital signal by a coder/decoder (CODEC) 52. Control signals stored in a ROM and RAM are read out under the control of a central processing unit (CPU) 53. A frame decomposing/composing circuit (F D/C) 54 composes a frame of 2B+D. This frame is transmitted to the S-reference point and the T-reference point through a driver 55 and pulse transformer 56.

In the receiver circuit of an ISDN terminal, a comparator and so forth is used to detect the digital input waveform of the input from the line side (S/T reference point) to output a signal to the frame decomposing/composing circuit (F D/C) 54 wherein it is synchronized with the signal on the line, or the frame is decomposed into B1, B2, and D channels and is transmitted as a receiving signal into the internal circuit.

Figure 3:
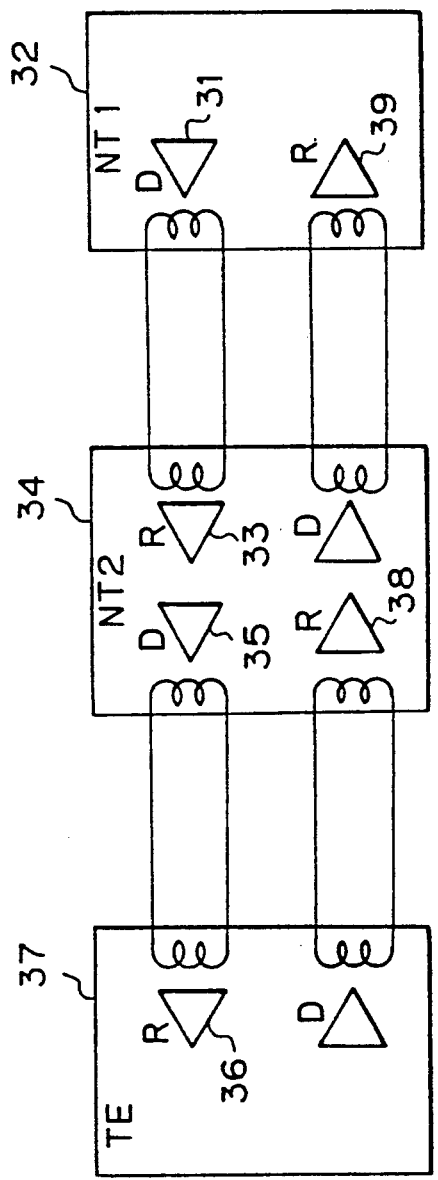
FIG. 3 is a block diagram showing an ISDN network system including receiver circuits.

FIG. 3 is a block diagram showing an ISDN network system including receiver circuits. As shown in the figure, a driver circuit (D) 31 in a network termination (NT1) 32 is connected through a pulse transformer to a receiver circuit (R) 33 in a network termination (NT2) 34. A driver circuit (D) 35 in the network termination (NT2) 34 is connected through a pulse transformer to a receiver circuit (R) 36 in an ISDN terminal 37. Similarly, in the opposite direction, the network termination (NT2) 34 includes a receiver circuit (R) 38, and the network termination (NT1) 32 includes a receiver circuit (R) 39. The present invention relates to threshold voltage for detecting signals input to these receiver circuits.

As the methods for determining the threshold voltage, conventionally, there is a fixed method in which the threshold voltages are constant, and an ATC (Automatic Threshold Control) method in which the threshold voltage is approximately linearly changed dependent on the peak voltage of the input signal.

Figure 4:
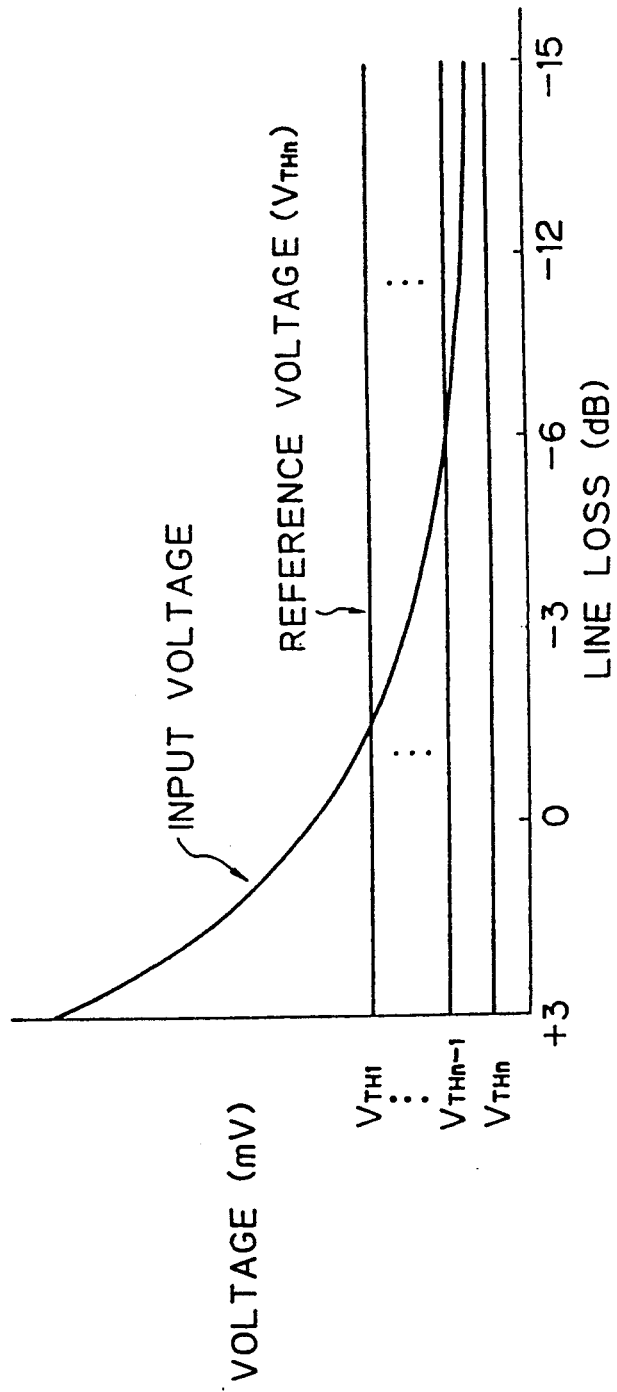
FIG. 4 is a graph for explaining a conventional fixed method of a threshold voltage.

FIG. 4 is a graph explaining the conventional fixed method. In the figure, it is depicted that the voltage of the input waveform is lowered in accordance with the increase of the line loss. In this way, the input signal level differs depending on the line length between the network termination (NT2) 43 and the other terminal.

Also, depending on the connection pattern in the connection between the network termination (NT2) 43 and the ISDN terminal (TE) 44, the amount of signal delay may change or the distortion of the waveform may change. There are various connection patterns, e.g., the cases where only one ISDN terminal (TE) 44 is connected to the network termination (NT2) 44 by a point-to-point connection, where all of the eight ISDN terminals (TE) 44 are positioned at places far from the network termination (NT2) 43 for more than 200 meters and are connected by a multi-point connection, and where only one of the eight terminals is placed to close to the network termination and the remaining seven terminals are placed at a remote location.

Further, depending on whether the format of the signal input to the receiver circuit is a continuous pulse format or a signal pulse format, the distortion of the waveform or the amount of signal delay may change.

As described above, when the waveform distortion or the amount of signal delay changes depending on the change of the line length, the connection pattern, and the signal format, the pulse width or the delay time of the signal transmitted to the internal circuit of the receiver circuit may change.

Because of the fluctuation of the pulse width or the delay time of the receiving signal, a problem arises regarding regulation of a total phase deviation defined in the 1.430 of the CCITT Recommendation. According to the regulation, the interval between the signal changing point of the output signal of an ISDN standard terminal (TE) and the signal changing point of the corresponding signal applied to the input of the ISDN standard terminal (TE) should not exceed the range between $-7\%$ and $+15\%$ of the bit period.

The total phase deviation is explained with reference to FIG. 5 and FIG. 6.

Figure 5:
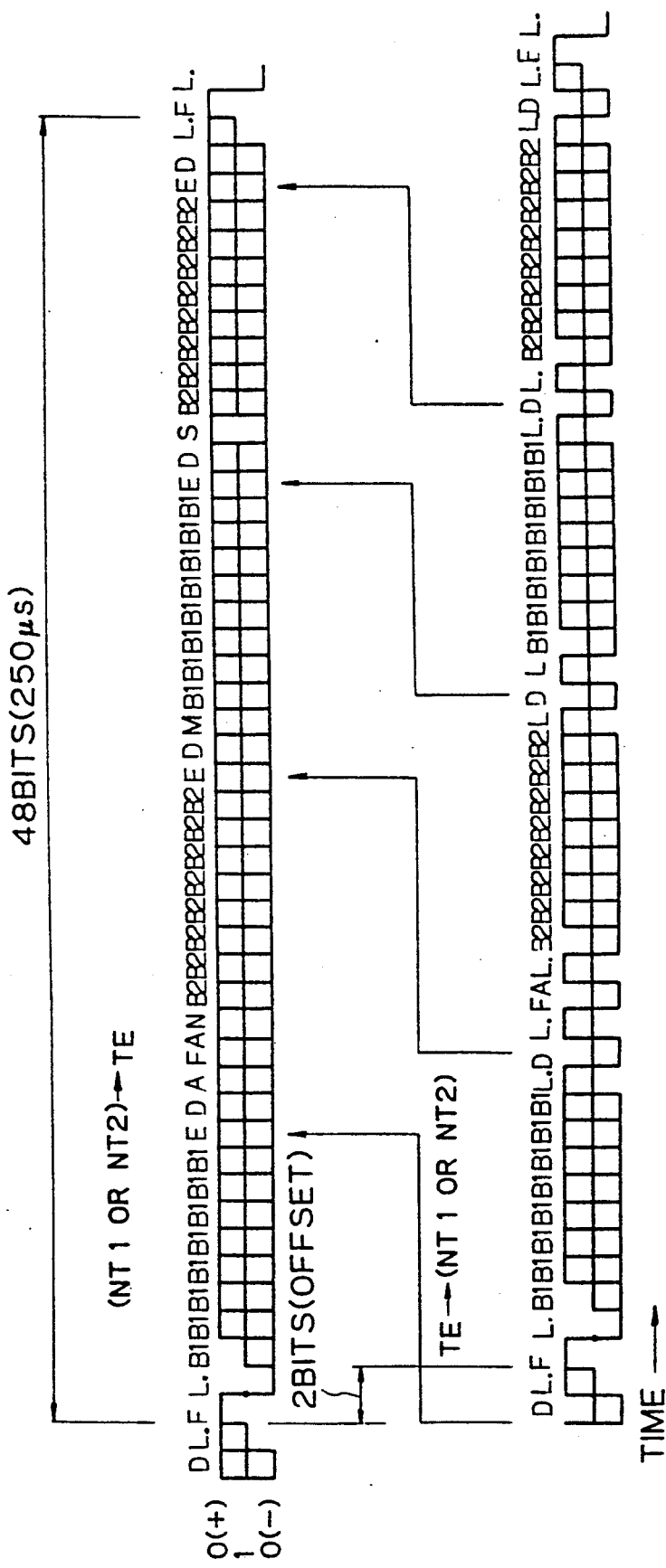
FIG. 5 is a diagram showing the frame construction in the reference point S/T of the user-network interface.

FIG. 5 is a diagram showing a conventional frame construction at the user-network interface reference point S/T. In the figure, the frame construction of the signal transmitted in the direction from the NT1 or NT2 to the TE is shown in the upper portion, and the frame construction of the signal output from the TE to the NT1 or N12 for establishing the frame synchronization in response to the signal in the upper portion is shown in the lower portion. Framing bits in both signals should be separated in time by a 2-bit offset.

Figure 6:
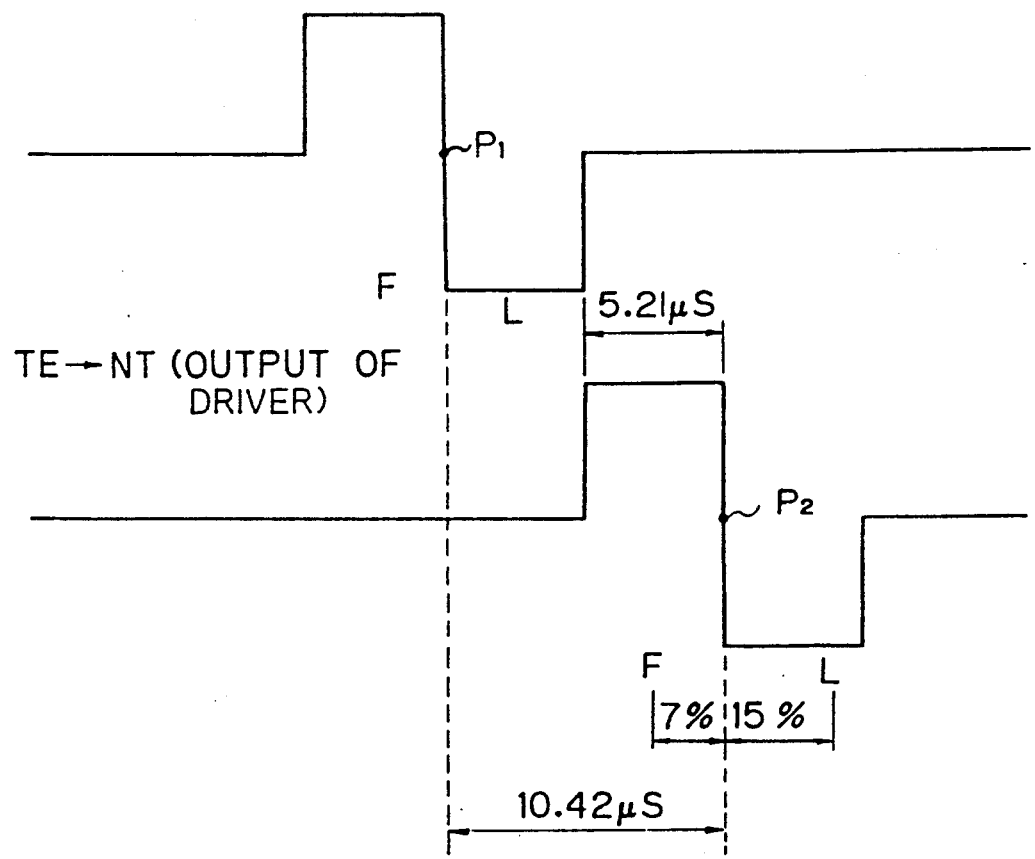
FIG. 6 is a diagram explaining the total phase deviation in the conventional system.

FIG. 6 is a diagram showing the framing-bit portion extracted and expanded from both signals in FIG. 5. As shown in the figure, the time difference between a zero-cross point $P_1$ of the frame pulse in the input signal into the receiver circuit in the terminal equipment (TE) and a zero-cross point $P_2$ of the frame pulse in the output signal from the driver circuit in the same terminal equipment (TE) as above is 10.42 $\mu$s which is double the 5.21 $\mu$s of the pulse width of one bit. Accordingly, the total phase deviation is within the regulation range between $-7\%$ and $*15\%$ of the pulse width of 5.21 $\mu$s.

The level of the signal, the waveform distortion, or the delay amount may fluctuate dependent on the change of the line length, connection pattern, and signal format as described before. Because of this fluctuation, it is difficult to satisfy the regulation of the total phase deviation when the receiving signal is detected by a signal threshold voltage according to the conventional fixed method. Therefore, as shown in FIG. 4, it may be considered to provide a plurality of threshold voltages $V_{TH1}, \ldots, V_{THn-1}$, and $V_{THn}$. By the method of providing a plurality of fixed threshold voltages, however, a complex circuit for switching these threshold voltages is required so that there are problems in that, not only does the cost become high, but also noises are easily generated at the time of switching the plurality of threshold voltages, and the input voltage cannot be detected linearly because each threshold voltage is fixed.

Figure 7:
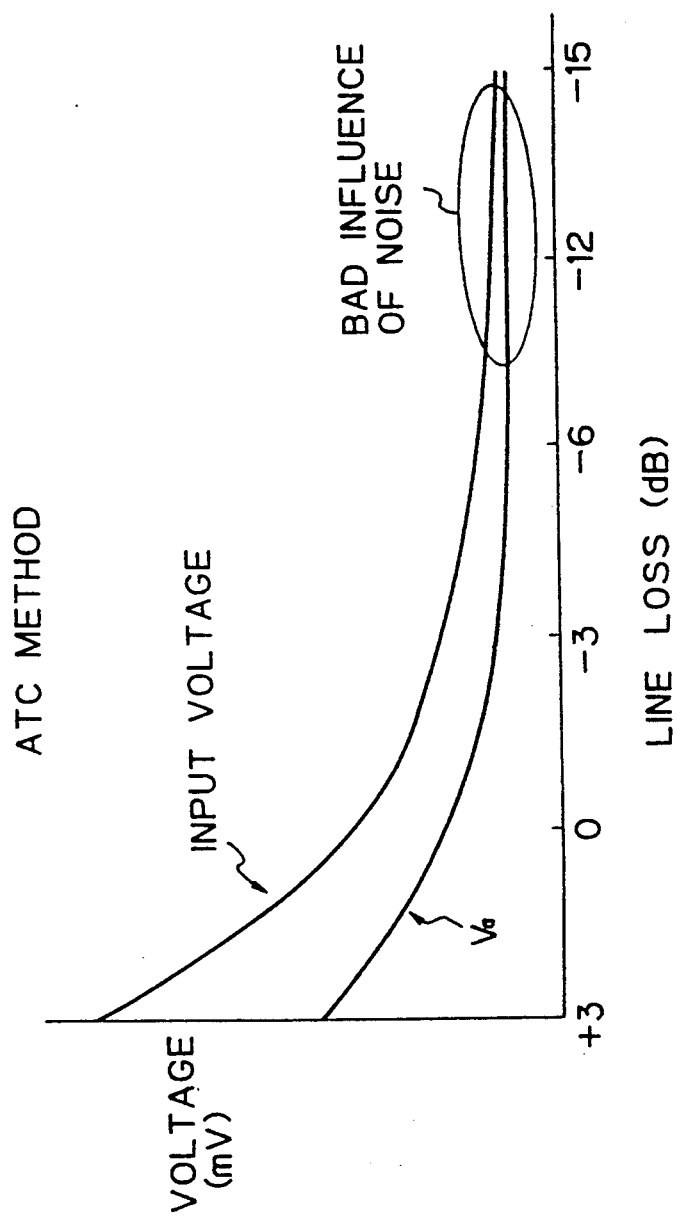
FIG. 7 is a graph explaining the conventional ATC system.

Therefore, conventionally, the ATC (Automatic Threshold Control) method for linearly changing the threshold voltage in accordance with the amplitude of the waveform has been developed. In this method, a peak value of the waveform on the line is detected, the peak value of the signal is held, and the voltage corresponding to the peak held value is used as a threshold voltage. FIG. 7 is a graph showing the change of the threshold voltage utilizing the ATC method. As shown in the figure, the input voltage of the receiving signal is lowered according to the increase of the line loss, and the threshold voltage is also lowered according to the decrease of the input voltage. The threshold voltage is determined to be, for example, about 50% of the input voltage.

By this ATC method, since the threshold voltage is approximately linearly change in accordance with the change of the input waveform voltage, the regulation of the total phase deviation is easily satisfied in comparison with the fixed method. However, in the case of the point-to-point connection, the line loss is increased in accordance with the elongation of the distance between the network termination (NT2) 43 and the network termination (NT1) 42 or the single ISDN terminal (TE) 44. According to the increase of the line loss, the signal level is lowered so that the noise level is close to the signal level. In this situation, noises and so forth are held at peak instead of holding the peak value of the signal level. In this case, since the threshold voltage is determined in accordance with the peak held value of the noises and so forth, the correct detection of the signal cannot be carried out so that the problems of bit errors and synchronization deviation easily occur. To avoid the bit errors or synchronization deviation, the distance between terminals in the point-to-point connection should be limited to be shorter than a constant in comparison with the fixed method.

From another point of view, consider the case when the eight ISDN terminals (TE) 44 are connected by a bus at the S reference point of the network termination (NT2) 43 shown in FIG. 1A. In this case, in the network termination (NT2) 43, the receiver circuit connected to the network termination (NT1) 42 is operated in a TE mode of the point-to-point connection, and the receiver circuit connected to the ISDN terminal (TE) 44 is operated in an NT mode of the multi-point connection. At the NT mode side, the eight ISDN terminals (TE) 44 always transmit frame synchronization signals even when signals of the B channel and the D channel are not transmitted. When the frame synchronization signals from a plurality of ISDN terminals (TE) 44 are superimposed at the S reference point, the level of the frame synchronization signal becomes higher than the signal level of the B channel or the D channel.

Figure 8A:
FIGS. 8A and 8B are diagrams explaining the problem of the superimposition of the frame synchronization signals in the conventional ATC system.
Figure 8B:
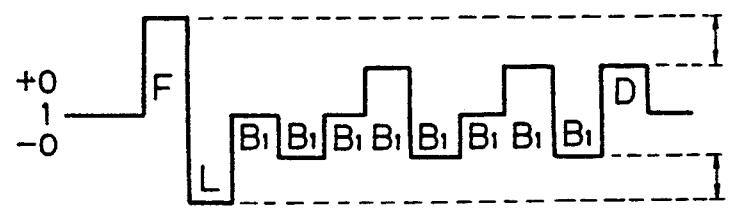

The elevated synchronization signal is explained in more detail with reference to FIGS. 8A and 8B. Namely, as shown in FIG. 8A, in the TE mode operation or even in the NT mode operation in case of the point-to-point connection, the height of the frame synchronization signal and the height of the B channel signal or the D channel signal are all the same. Note that the signals shown in FIGS. 8A and 8B are AMI codes. In contrast, as shown in FIG. 8B, in case of the multipoint connection in the NT mode, when the frame synchronization signals are superimposed, the high level of the frame synchronization signal becomes higher than the high level of the B channel signal or the D channel signal, and the low level of the frame synchronization signal becomes lower than the low level of the B channel signal or the D channel signal. In this case, when the conventional ATC method is applied, the elevated level of the frame synchronization signal is held as peak, and the threshold value is determined in accordance with the peak held value. Therefore, the threshold value is too high to detect the input signal of the B channel or the D channel so that the digital signal level cannot be correctly determined.

As a countermeasure to the increase of the threshold voltage due to the superimposition of the frame synchronization signals, it may be considered to have different threshold voltages in the NT mode receiver circuit and the TE mode receiver circuit. However, if two receiver circuits having different characteristics are provided in the network termination (NT2) 43, two kinds of evaluation tests should be effected so that the evaluation tests become complicated. Further, since the receiver circuits having different characteristics should be constructed by different circuits having different characteristics, the cost becomes high.

In conclusion, in the conventional arts, there are problems in that the regulation of the total phase deviation cannot be satisfied in the fixed method, that the threshold voltage fluctuates due to noises and so forth in the ATC method, and that the threshold voltage fluctuates due to the superimposition of the frame synchronization signals in the multipoint connection.

In view of the problems in the above-mentioned prior arts, an object of the present invention is, based on the idea of adding a NT/TE switching function, in the ATC system, to prevent bit errors or synchronization deviation in the receiver circuit due to the fluctuation of the digital signal determining threshold value by the influence of noises, or due to the fluctuation of digital signal determining threshold value by the superimposition of frame signals when a plurality of ISDN terminals are connected to a network termination by a bus.

Next, embodiments of the present invention will be described with reference to FIGS. 9 to 15.

Figure 9:
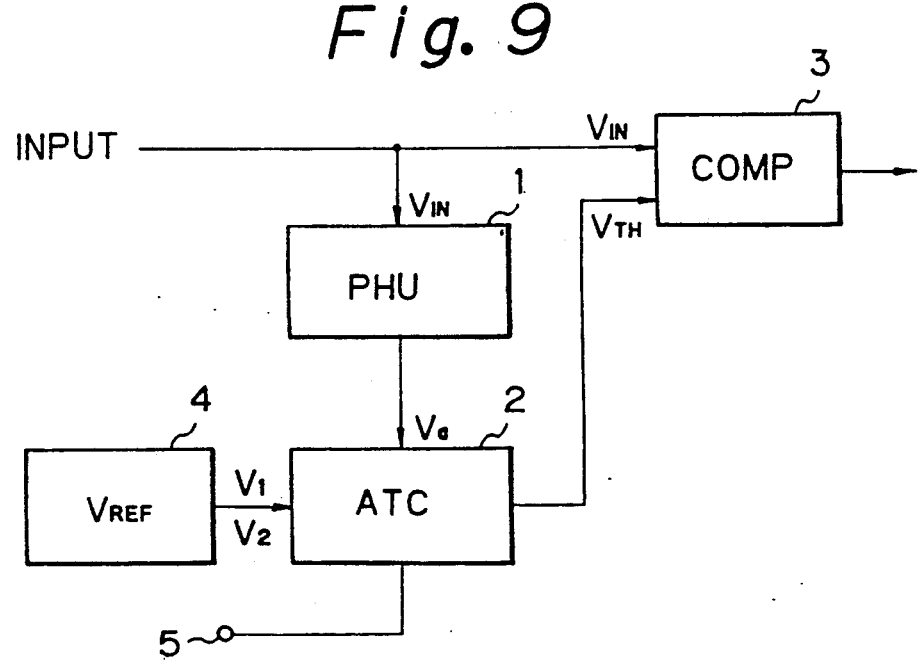
FIG. 9 is a principal block diagram of the present invention.

FIG. 9 is a principal block diagram of a receiver circuit in an ISDN terminal or a network termination according to an embodiment of the present invention. In the figure, 1 is a peak voltage holding unit (PHU) for holding the peak voltage value of an input signal, 2 is an automatic threshold value control unit (ATC) for outputting a variable threshold value Va which varies according to the peak voltage value held in the peak voltage holding unit 1, 3 is a comparing unit (COMP) for comparing the voltage value of the input signal and the variable threshold value Va which is output from the automatic threshold control unit 2, to discriminate the digital signal level of the input signal, 4 is a constant threshold generating unit ($V_{REF}$) for outputting a constant threshold value $V_1$ by which the digital signal level of the input signal can be discriminated even when the digital signal level of the input signal cannot be discriminated by an increased variable threshold value Va which has been increased in accordance with the increase of the input signal voltage.

According to a first aspect of the present invention, the automatic threshold control unit 2 outputs the variable threshold value Va when the variable threshold value Va is equal to or smaller than the constant threshold value $V_1$ output from the constant threshold generating unit 4, and outputs the constant threshold value $V_1$ output from the constant threshold generating unit 4 when the variable threshold value Va is larger than the above-mentioned constant threshold value $V_1$.

According to a second aspect of the present invention, the constant threshold generating unit 4 outputs a first constant threshold value $V_1$ by which the digital signal level of the input signal can be discriminated even when the digital signal level $V_{IN}$ of the input signal cannot be discriminated by an increased variable threshold value Va which has been increased in accordance with the increase of the input signal voltage $V_{IN}$, and outputs a second constant threshold value $V_2$ by which the digital level of the input signal can be discriminated even when the influence of the noise level on the variable threshold value Va can not be neglected in accordance with the decrease of the voltage of the input signal. The automatic threshold control unit 2 has a mode setting terminal 5 for switching between an NT mode used in the case of bus connection and a TE mode used in the case of point-to-point connection. Namely, when the receiver circuit is included in a device acting as a network termination in an ISDN network, the NT mode is set; and when the receiver circuit is included in a device acting as terminal equipment in an ISDN network, the TE mode is set. When the NT mode is set at the mode setting terminal 5, the automatic threshold control unit 2 outputs the variable threshold value Va to the comparing unit 3 when the variable threshold value Va is equal to or lower than the first constant threshold value $V_1$, and outputs the first constant threshold value $V_1$ output from the constant threshold generating unit 4 to the comparing unit 3 when the variable threshold value Va is higher than the first constant threshold $V_1$. When the TE mode is set at the mode setting terminal 5, the automatic threshold control unit 2 outputs the variable threshold value Va even when the variable threshold value Va is higher than the first constant threshold value $V_1$. In the case of either the NT mode setting time or the TE mode setting time, the automatic threshold control unit 2 outputs the second constant threshold value $V_2$ output from the constant threshold generating unit 4 when the variable threshold value Va is smaller than the second constant threshold value $V_2$.

The eight ISDN terminals (TE) 44 may be located at a far-end position or at a near-end position with respect to the network termination (NT1) 42 or (NT2) 43. When the eight ISDN terminals are located at a near-end position, the signal levels at the input of the network termination are different because the distance between the ISDN terminals is relatively long. Even when the signal levels are different, however, it is sufficient for detecting each signal level to determine the first constant threshold value $V_1$ and the second constant threshold value $V_2$ to be smaller than the lowest signal level.

According to the first aspect of the embodiment of the present invention, when the variable threshold value Va is higher than the constant threshold value $V_1$, output from the constant threshold generating unit 4, the constant threshold value $V_1$ output form the constant threshold generating unit 4 is output to the comparing unit 3, and thereby, in the ATC method, even when the frame synchronization signals from a plurality of terminals are superimposed in the case of the multipoint connection, the threshold voltage is fixed to the constant threshold value $V_1$ so that the bit errors or the synchronization deviations can be prevented.

According to the second aspect of the present invention, by switching the mode setting in accordance with the location of the usage of the receiver circuit, the fluctuation of the threshold voltage due to noises in the case of the point-to-point connection can be prevented, and thereby bit errors or synchronization errors can be prevented.

Namely, according to the present invention, only by switching the mode setting, an appropriate threshold voltage in conformity with the respective characteristics of the NT and the TE modes can be obtained.

Figure 10:
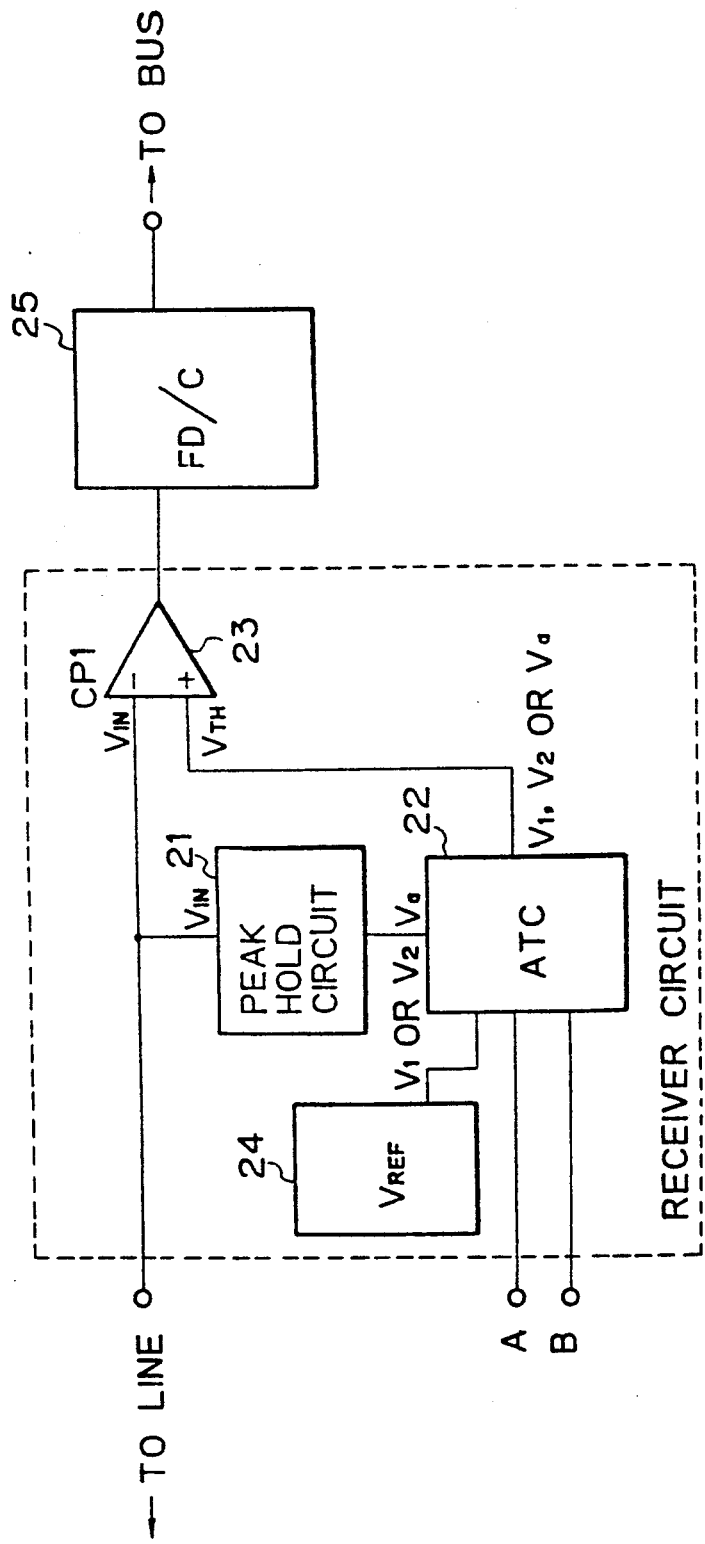
FIG. 10 is a block diagram of a receiver circuit in an ISDN terminal according to an embodiment of the present invention.

FIG. 10 is a block diagram showing the construction of a receiver circuit in an ISDN terminal or a network termination, according to an embodiment of the present invention. In the figure, 21 is a peak hold circuit for holding the peak voltage value of the input signal, 22 is an ATC circuit for outputting a variable threshold value Va which varies in accordance with the peak voltage value, 23 is a comparator for comparing the voltage value $V_{IN}$ of the input signal and the output of the ATC circuit 22 to determine the digital signal level of the input signal, 24 is a constant threshold generating circuit for outputting a constant threshold value $V_1$ by which the digital signal level of the input signal can be recognized even when the digital signal level of the input signal cannot be discriminated by the variable threshold value Va because the variable threshold value has been increased to be too high in accordance with the increase of the input signal voltage $V_{IN}$. The constant threshold generating circuit 24 also generates a second constant threshold value $V_2$ by which the digital signal level of the input signal can be discriminated even when the digital signal level of the input signal cannot be discriminated by the variable threshold value Va which has been decreased to be too low so that the negative influence of noises cannot be neglected.

By setting the terminal A and B either manually or under the control by the CPU, the ATC circuit 22 is set in an NT mode or in a TE mode in which the receiver circuit is used. When the receiver circuit is to be connected to an ISDN terminal (TE) by a bus, the ATC circuit 22 is set to the NT mode. When the receiver circuit is to be connected to the network termination (NT1) or (NT2) by a point-to-point connection, the ATC circuit 22 is set to the TE mode. The mode setting is realized by inputting a setting signal to the mode setting terminals A and B. As the mode settings, other than the NT mode and the TE mode, it is also possible to set the conventional fixed system, ATC system, externally input mode, and so forth. In the illustrated example, since there are two setting terminals, four different mode settings are possible. If it is desired to further increase the number of the setting modes, the number of setting terminals may be increased.

Figure 11:
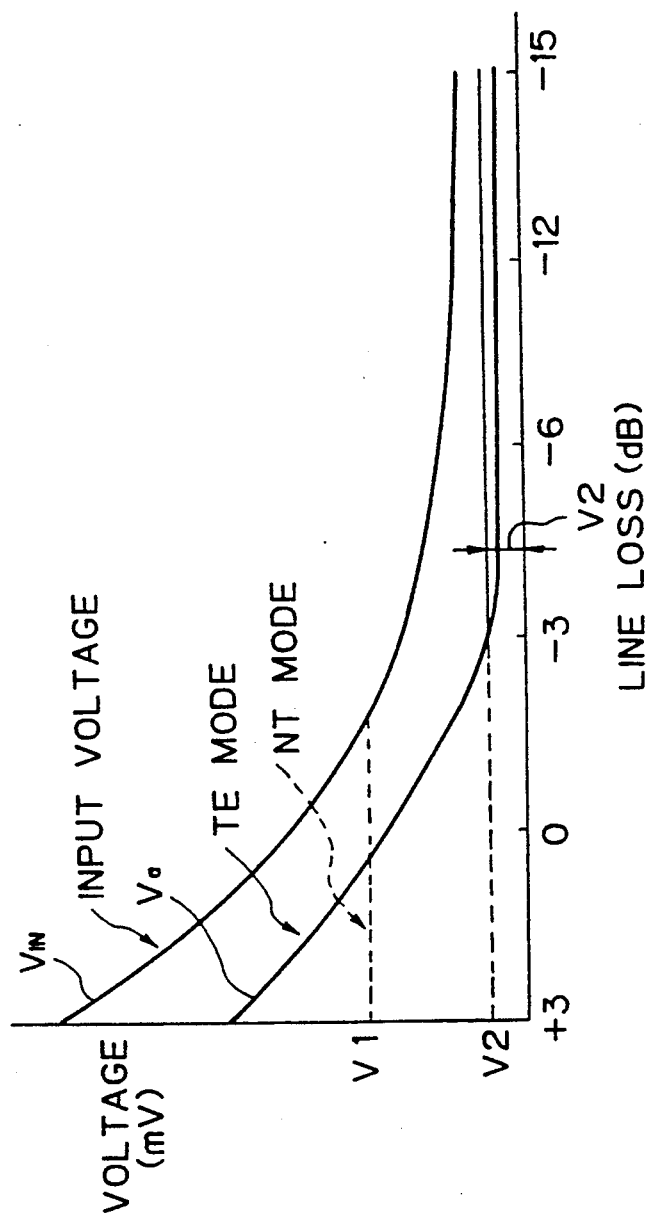
FIG. 11 is a graph diagram for explaining the operation of the circuit in FIG. 10.

FIG. 11 is a graph illustrating the relation between the input waveform voltage and the threshold voltage, for explaining the operation of the circuit shown in FIG. 10.

In FIG. 10 and FIG. 11, even when the discrimination of the digital signal level of the input signal is impossible by the variable threshold value Va which has been increased to be too high in accordance with the increase of the input signal voltage, for example, in FIG. 11, even when the input variable threshold value Va is over $V_1$, the constant threshold forming circuit 24 outputs the first constant threshold value $V_1$ by which the digital signal level of the input signal can be discriminated. Also, even when the influence of the noise level in the input signal on the variable threshold value Va cannot be neglected in accordance with the decrease of the input signal voltage $V_{IN}$, the second constant threshold value $V_2$ by which the digital signal level $V_{IN}$ of the input signal can be discriminated is output.

When the NT mode is being set, the ATC circuit 22 outputs to the comparator 23, when the variable threshold value Va is below the first constant threshold value $V_1$, the variable threshold value Va which varies in response to the change of the input voltage in accordance with the conventional ATC methods. When the variable threshold value Va exceeds the first constant threshold value $V_1$, the first constant threshold value $V_1$ output from the constant threshold generating circuit 24 is output from the ATC circuit 22 to the comparator 23. Namely, at the time of setting the NT mode, by the operation of the ATC circuit 22, three stages are switched among the fixed method when the line loss is small, the ATC method in the next step, and then the fixed method when the line loss becomes larger.

When the TE mode is being set, the ATC circuit 22 outputs the variable threshold value Va even when the variable threshold value Va is higher than the first constant threshold value $V_1$. Namely, in the TE mode, when the input signal voltage $V_{IN}$ is high, the conventional ATC method is employed; and when the line loss becomes large, the fixed method is employed in the same way as the NT mode setting time.

At either the NT mode setting time or the TE mode setting time, the ATC circuit 22 outputs the second constant threshold value $V_2$ output from the constant threshold generating circuit 24 when the variable threshold value Va is smaller than the second constant threshold value $V_2$.

In the conventional ATC method, there is a problem of the fluctuation of the threshold voltage due to the influence of the noises and so forth in accordance with the elongation of the line length. In contrast, according to the system of the present invention, as described above, the ATC method and the fixed method are combined so that when the variable threshold voltage Va by the ATC method is lower than $V_2$, it is switched to the fixed system, so that noises and so forth do not influence on the threshold voltage even when the line length is elongated. In this case, the fixed threshold level $V_2$ should be sufficiently high so that noise waveforms are not detected when there is no signal on the line.

Also, in the conventional art, there is a problem in that the digital level $V_{IN}$ of the input signal cannot be discriminated by the variable threshold value Va due to the superimposition of the frame signals at the time of bus connection and due to the higher level of the frame synchronization signal higher than the B or D channel signal. In contrast, when the NT mode is being set according to the embodiment of the present invention, and when the line loss is small, the threshold voltage is fixed to $V_1$ so that the above-mentioned problem is resolved.

The discriminated level of the input signal compared with the digital signal discriminating threshold value by the comparator 25 is output to the frame decomposition/composition circuit 25 in the layer 1.

Figure 12:
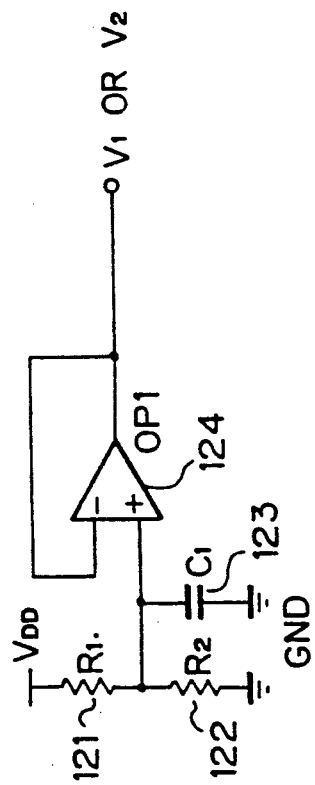
FIG. 12 is a circuit diagram showing an example of the reference voltage generating circuit.

FIG. 12 is a circuit diagram showing an example of the constant threshold forming circuit 24 shown in FIG. 10. In the figure, the constant threshold generating circuit 24 is constructed by resistors ($R_1$ and $R_2$) 121 and 122, a capacitor ($C_1$) 123, and an operational amplifier (OP1) 124. The resistors 121 and 122 are connected in series between the power supply line $V_{DD}$ and ground. The connecting point between the resistors 121 and 122 is connected to the noninverting input of the operational amplifier 124. The capacitor 123 is connected between the noninverting input of the operational amplifier 124 and ground. The output of the operational amplifier 124 is connected to the inverting input thereof. By this construction, the first or the second constant threshold value $V_1$ or $V_2$ is determined by the ratio of the resistances of the resistors 121 and 122.

Figure 13:
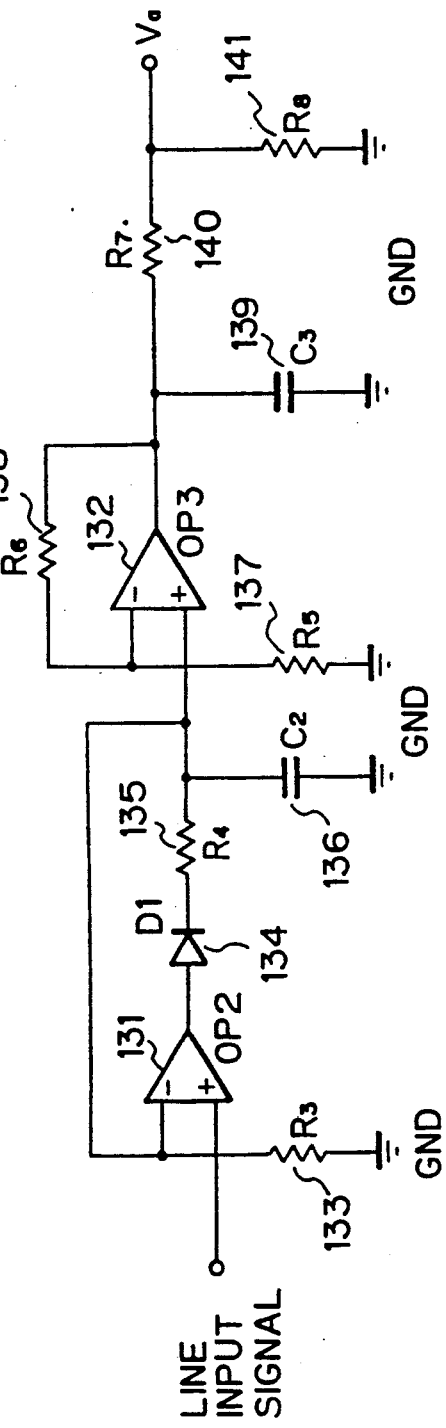
FIG. 13 is a circuit diagram showing an example of the peak hold circuit.

FIG. 13 is a circuit diagram showing an example of the peak hold circuit 21 shown in FIG. 10. In the figure, the peak hold circuit 21 is constructed by two operational amplifiers (OP2 and OP3) 131 and 132, a resistor ($R_3$) 133 connected between the inverting input of the operational amplifier 131 and ground, a diode (D1) 134 for conducting a positive current, a resistor ($R_4$) 135 and a capacitor ($C_2$) 236 constituting an integrating circuit for holding the peak voltage of the input signal applied to the noninverting input of the operational amplifier 131, resistors ($R_5$ and $R_6$) 137 and 138 for amplifying the voltage applied to the noninverting input of the operational amplifier 132, a capacitor ($C_3$) 139 connected between the output of the operational amplifier 132 and ground, and resistors ($R_7$ and $R_8$) 140 and 141 connected in series between the output of the operational amplifier 132 and ground. At the connecting point between the resistors 140 and 141, an output voltage which is held at the peak value of the input signal is obtained.

Figure 14:
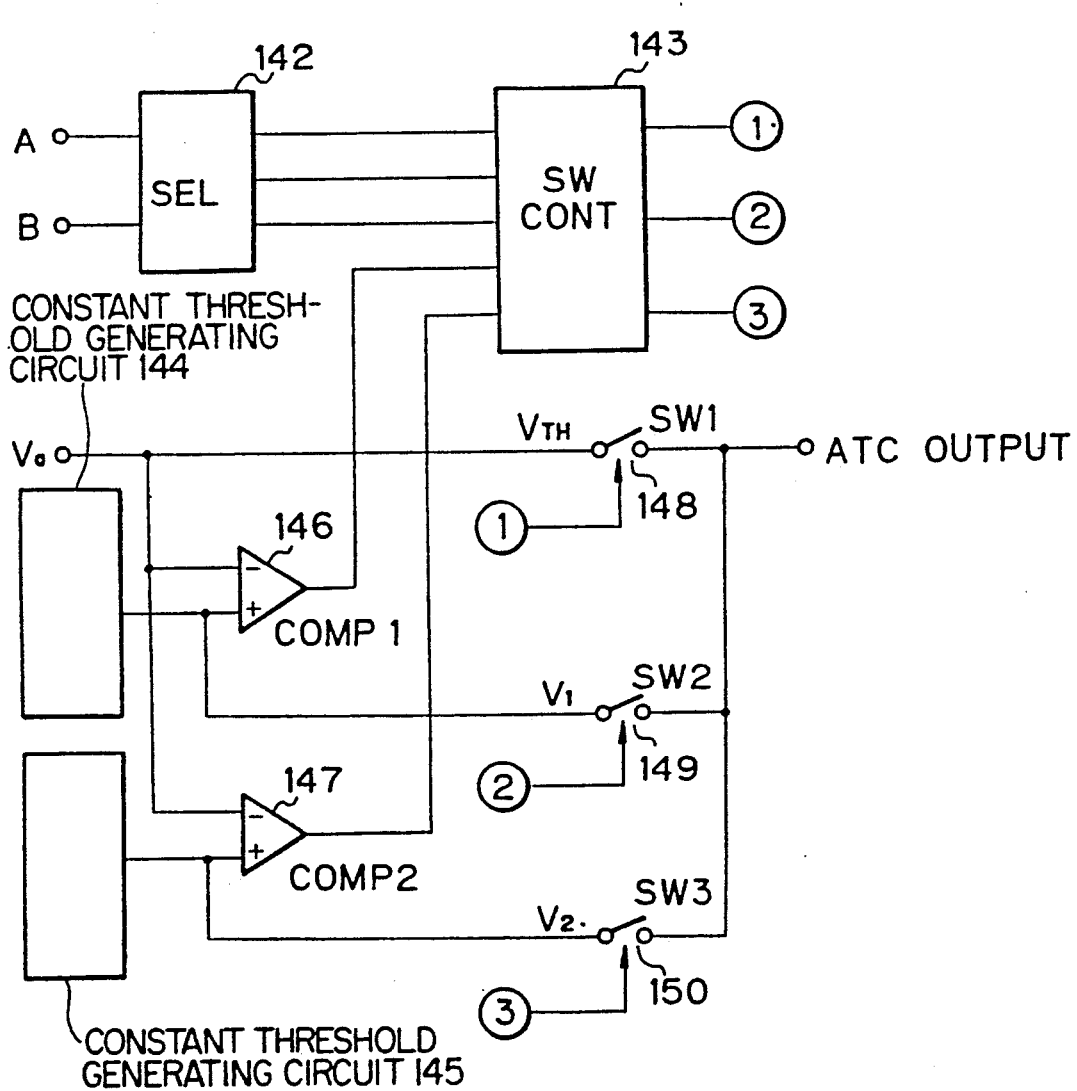
FIG. 14 is a circuit diagram showing an example of the ATC circuit.

FIG. 14 is a block diagram showing an example of the ATC circuit 22 shown in FIG. 10. In the figure, the ATC circuit 22 is constructed by a selector circuit (SEL) 142, a switch control circuit (SW CONT) 143, two constant threshold generating circuits 144 and 145, two comparators (COMP1 and COMP2) 146 and 147, and three switches (SW1, SW2 and SW3) 148, 149 and 150. The constitution of each of the constant threshold generating circuits 144 and 145 is substantially the same as shown in FIG. 12, where the constant threshold value $V_1$ or $V_2$ is determined by the ratio of the resistances $R_1$ and $R_2$.

In operation of the ATC circuit, the selector circuit 142 outputs a 3-bit selecting signal in response to a 2-bit mode setting signal applied to setting terminals A and B. The constant threshold generating circuit 144 outputs the first constant threshold value $V_1$, the constant threshold generating circuit 145 outputs the second constant threshold value $V_2$. The comparator 146 outputs a high level signal when the variable threshold value Va is higher than the first constant threshold value $V_1$, and outputs a low level signal when the variable threshold value Va is lower than the first constant threshold value $V_1$. Similarly, the comparator 147 outputs a high level signal when the variable threshold value Va is higher than the second constant threshold value $V_2$, and outputs a low level signal when the variable threshold value Va is lower than the second constant threshold value $V_2$. Based on the selecting signal from the comparators 146 and 147, the switch control circuit 143 selects one of the three outputs ①, ② and ③ to be energized. In response to the energized output signal ①, ② or ③, the corresponding switch 148, 149 or 150 is turned on to output an ATC output signal. Namely, when the set mode is the NT mode, only the switch 149 is turned ON to output the $V_1$ as the ATC output signal when Va is larger than $V_1$; only the switch 148 is turned ON to output the Va as the ATC output signal when Va is smaller than $V_1$ and higher than $V_2$; and only the switch 150 is turned ON to output the $V_2$ as the ATC output signal when Va is lower than $V_2$. Similarly, when the set mode is the TE mode, only the switch 148 is turned ON to output Va when Va is higher than $V_2$; and only the switch 150 is turned ON when Va is lower than $V_2$.

Figure 15:
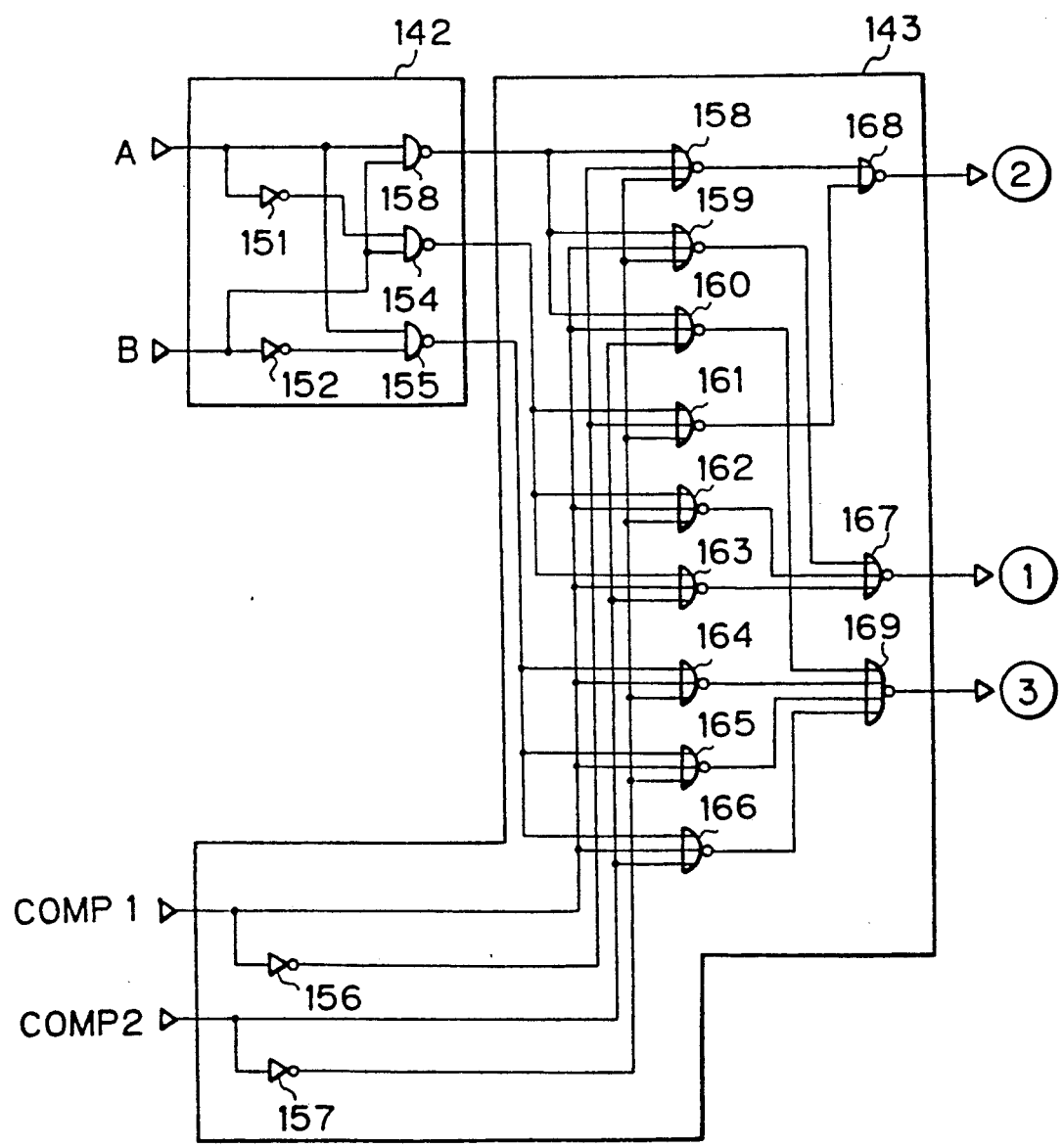
FIG. 15 is a circuit diagram showing an example of the selector circuit and the switch control circuit in the circuit shown in FIG. 14.

FIG. 15 is a circuit diagram showing an example of the construction of the selector circuit 142 and the switch control circuit 143 shown in FIG. 14. In the figure, the selector circuit 142 is constructed by inverters 151 and 152, and NAND gates 153, 154, and 155 forming a decoder. Similarly, the switch control circuit 143 is constructed by inverters 156 and 157, and NAND gates 158 to 169, forming an another decoder.

As will be apparent from the foregoing description, according to the present invention, in a receiver circuit in an ISDN terminal or in a network termination, since the influence of noises on the line on the threshold voltage is removed, and in the NT mode, since the negative influence of the superimposed waves of frame synchronization signals on the signal detection is removed, bit errors or synchronization deviation due to these influences can be prevented. Also, by providing the switching function between the NT mode and the TE mode, circuits having the same characteristic can be commonly used for either the NT mode or the TE mode so that the cost is lower in comparison with the case when the circuits are manufactured with different characteristics for the NT mode and the TE mode.

We claim:

1. A threshold value control system for discriminating an input signal received by a receiver circuit connected to terminals in a connection pattern, comprising:

mode setting means for determining a mode setting signal based on the connection pattern by which the receiver circuit is connected to one of the terminals;

variable threshold generating means for generating a variable threshold value dependent on the level of the input signal;

constant threshold generating means for generating at least one constant threshold value by which the level of the input signal can be discriminated even when the level of the input signal cannot be distinguished by said variable threshold value;

threshold comparing means, operatively connected to said variable threshold generating means and said constant threshold generating means, for comparing the variable threshold value and each of said at least one constant threshold values to output a comparison result;

switching means, operatively connected to said variable threshold generating means, said constant threshold generating means, said mode setting means and said threshold comparing means, for passing only one of said variable threshold value and said at least one constant threshold value to output a discriminating threshold value based on the mode setting signal determined by said mode setting means and the comparison result output from said threshold comparing means, the discriminating threshold value output of said switching means being sufficient to discriminate a digital level of the input signal; and comparing means, operatively connected to receive input signal and the discriminating threshold, for comparing the input signal and the discriminating threshold value to output a discrimination result.

2. A threshold value control system as claimed in claim 1, wherein said receiver circuit is included in one of NT1, NT2, and ISDN terminals in an ISDN network.

3. A threshold value control system as claimed in claim 1, wherein said mode setting means comprises a decoder connected to obtain a mode selecting signal and connected to decode plural bits of the mode selecting signal to generate the mode setting signal.

4. A threshold value control system as claimed in claim 1,
wherein the receiver circuit is included in a terminal in an ISDN network; and
wherein said mode setting means comprises means for generating a NT mode selecting signal when said receiver circuit acts as a network termination in an ISDN network.

5. A threshold value control system as claimed in claim 1,
wherein the receiver circuit is included in a terminal in an ISDN network; and
wherein said mode setting means comprises means for generating a TE mode selecting signal when said receiver circuit acts as terminal equipment in an ISDN network.

6. A threshold value control system as claimed in claim 1, further comprising peak holding means for receiving the input signal and outputting a peak level of the input signal.

7. A threshold value control system as claimed in claim 6, wherein said variable threshold generating means comprises means for generating the variable threshold value as a predetermined percentage of the peak level of the input signal so that the variable threshold value increases in accordance with an increase of the peak level of the input signal.

8. A threshold value control system as claimed in claim 1,
wherein said constant threshold generating means comprises
value comparing means for comparing the variable threshold value with each of said at least one constant threshold values to generate a compared result; and
switch control means, operatively connected to said mode setting means and said value comparing means, for generating a switch control signal based on the mode setting signal and the comparison result output from said threshold comparing means; and
wherein said discriminating threshold value is output from said switching means in response to the switch control signal output from said switch control means.

9. A threshold value control system as claimed in claim 1,
wherein the receiver circuit is included in a terminal in an ISDN network; and
wherein said mode setting means comprises
means for generating an NT mode selecting signal when said receiver circuit acts as a network termination in an ISDN network, and
means for generating a TE mode selecting signal when said receiver circuit acts as terminal equipment in an ISDN network.

10. A threshold value control system as claimed in claim 9,
wherein said constant threshold generating means comprises first threshold voltage generating means for generating a first constant threshold value by which a level of the input signal can be discriminated by said comparing means even when the variable threshold value is increased to be higher than said first constant threshold value so that the level of the input signal cannot be discriminated by the increased variable threshold value due to superimposition of frame signals from a plurality of terminals; and
wherein said switching means comprises means for outputting the first constant threshold value when the variable threshold value is higher than the first constant threshold value and when said mode setting means generates the NT mode selecting signal.

11. A threshold value control system as claimed in claim 9,
wherein said constant threshold generating means comprises first threshold voltage generating means for generating a second constant threshold value by which the input digital signal level can be discriminated by said comparing means even when the variable threshold value is increased to be higher than said second constant threshold value; and
wherein said switching mean comprises means for outputting the second constant threshold value when the variable threshold value is lower than the second constant threshold value and when said mode setting means generates the NT mode selecting signal.

12. A threshold value control system as claimed in claim 9, wherein said switching means comprises means for outputting the variable threshold value when the first constant threshold value is higher than the variable threshold value and the second constant threshold value is lower than the variable threshold value and when said mode setting means generates the NT mode selecting signal.

13. A threshold value control system as claimed in claim 9, wherein said switching means comprises means for outputting the second constant threshold value when the variable threshold value is lower than the second constant threshold value and when said mode setting means generates the NT mode selecting signal.

14. A threshold value control system as claimed in claim 9, wherein said switching means comprises means for outputting the variable threshold value when the second constant threshold value is lower than the variable threshold value and when said mode setting means generates the TE mode selecting signal.

15. A threshold value control system as claimed in claim 9, wherein said switching means comprises means for outputting the second threshold value when the variable threshold value is lower than said second constant threshold value and when said mode setting means generates the TE mode selecting signal.

16. A threshold value control system as claimed in claim 1,
wherein said constant threshold generating means comprises means for generating the constant threshold value by which a level of the input signal can be discriminated by said comparing means even when the variable threshold value is increased to be higher than said first constant threshold value so that the input digital signal level cannot be discriminated by the increased variable threshold value due to superimposition of frame signals from a plurality of terminals; and
wherein said switching means comprises means for outputting the variable threshold value to said comparing means when the constant threshold value is higher than the variable threshold value and for outputting the constant threshold value when the variable threshold value is higher than the constant threshold value.

17. A threshold value control system as claimed in claim 1,
wherein said constant threshold generating means comprises means for generating the constant threshold value by which a level of the input signal can be discriminated by said comparing means even when the variable thresholds value is increased to be higher than said second constant threshold value; and
wherein said switching means comprises means for outputting said variable threshold value to said comparing means when the second constant threshold value, is lower than the variable threshold value and for outputting the second constant threshold value when the variable threshold value is higher than the second constant threshold value.

18. A threshold value control system as claimed in claim 9, wherein said switching means comprises
means for outputting the variable threshold value when the first constant threshold value is higher than the variable threshold value and the second constant threshold value is lower than the variable threshold value and when said mode setting means generates the NT mode selecting signal;
means for outputting said second constant threshold value when the variable threshold value is lower than the second constant threshold value and when said mode setting means generates the NT mode selecting signal;
means for outputting the variable threshold value when the second constant threshold value is lower than the variable threshold value and when said mode setting means generates the TE mode selecting signal; and
means for outputting the second constant threshold value when the variable threshold value is lower than the second constant threshold value and when said mode setting means generates the TE mode selecting signal.

* * * * *